(12) United States Patent
Baxter

(10) Patent No.: US 12,338,740 B2
(45) Date of Patent: Jun. 24, 2025

(54) CARBON CAPTURE SYSTEM AND METHOD WITH RECUPERATIVE POWER RECOVERY

(71) Applicant: Sustainable Energy Solutions, Inc., Ball Ground, GA (US)

(72) Inventor: Larry Baxter, Orem, UT (US)

(73) Assignee: Sustainable Energy Solutions, Inc., Ball Ground, GA (US)

( * ) Notice: Subject to any disclaimer, the term of this patent is extended or adjusted under 35 U.S.C. 154(b) by 0 days.

(21) Appl. No.: 18/423,581

(22) Filed: Jan. 26, 2024

(65) Prior Publication Data

US 2024/0254891 A1   Aug. 1, 2024

Related U.S. Application Data

(60) Provisional application No. 63/481,916, filed on Jan. 27, 2023.

(51) Int. Cl.
| | |
|---|---|
| *F01D 15/10* | (2006.01) |
| *B01D 3/40* | (2006.01) |
| *B01D 53/00* | (2006.01) |
| *B01D 53/14* | (2006.01) |
| *B01D 53/18* | (2006.01) |
| *B01D 53/26* | (2006.01) |
| *B01D 53/30* | (2006.01) |
| *F25J 3/06* | (2006.01) |

(52) U.S. Cl.
CPC ............... *F01D 15/10* (2013.01); *B01D 3/40* (2013.01); *B01D 53/002* (2013.01); *B01D 53/1406* (2013.01); *B01D 53/145* (2013.01); *B01D 53/1475* (2013.01); *B01D 53/1493* (2013.01); *B01D 53/18* (2013.01); *B01D 53/263* (2013.01); *B01D 53/265* (2013.01); *B01D 53/30* (2013.01); *F25J 3/062* (2013.01); *B01D 2252/102* (2013.01); *B01D 2252/2021* (2013.01); *B01D 2252/204* (2013.01); *B01D 2257/504* (2013.01); *B01D 2257/80* (2013.01); *B01D 2258/0283* (2013.01); *F05D 2260/20* (2013.01)

(58) Field of Classification Search
CPC .. F01D 15/10; F05D 2260/20; F05D 2260/61; F05D 2220/62
See application file for complete search history.

(56) References Cited

U.S. PATENT DOCUMENTS

| | | | |
|---|---|---|---|
| 9,181,873 B2 | 11/2015 | Peter et al. | |
| 11,635,255 B1 | 4/2023 | Stiles et al. | |
| 2008/0083226 A1* | 4/2008 | Joshi | F02C 3/34 60/772 |
| 2011/0113779 A1 | 5/2011 | Polvi | |

(Continued)

FOREIGN PATENT DOCUMENTS

CN   101939075 A   1/2011

OTHER PUBLICATIONS

International Search Report and Written Opinion, counterpart PCT/US2024/013157 (Jun. 11, 2024) (14 pages).

*Primary Examiner* — Sean Gugger
(74) *Attorney, Agent, or Firm* — Cook Alex Ltd.

(57) ABSTRACT

Methods and systems for recuperating power from a pressurized fluid stream of a carbon capture system are disclosed. A compressor pressurizes the carbon dioxide containing feed fluid and passes this fluid stream through a carbon capture process. The pressurized stream is expanded across a turbine where power is recovered.

12 Claims, 3 Drawing Sheets

(56) References Cited

U.S. PATENT DOCUMENTS

| | | | |
|---|---|---|---|
| 2012/0031101 A1* | 2/2012 | Hoffmann | F01D 17/141 |
| | | | 60/39.52 |
| 2012/0216547 A1 | 8/2012 | Li et al. | |
| 2014/0007590 A1* | 1/2014 | Huntington | F02C 3/04 |
| | | | 60/801 |
| 2016/0237860 A1* | 8/2016 | Malinim | F01K 25/103 |

* cited by examiner

CARBON CAPTURE SYSTEM AND METHOD WITH RECUPERATIVE POWER RECOVERY

CLAIM OF PRIORITY

This application claims the benefit of U.S. Provisional Patent Application No. 63/481,916, filed Jan. 27, 2023, the contents of which are hereby incorporated by reference.

FIELD OF DISCLOSURE

The systems and methods herein relate generally to power production. More particularly, the systems and methods relate to power recuperation in carbon capture systems.

BACKGROUND

Intermittent carbon capture is a necessity based on current scientific consensus, but energy requirements are high for even the most efficient carbon dioxide recovery systems. Improved carbon capture will require advancement in all fluid handling fields.

SUMMARY

In a first aspect, the disclosure provides a system for recuperating power from a pressurized feed fluid stream of a carbon capture system. A compression system is configured to compress a feed fluid stream, resulting in the pressurized feed fluid stream. The feed fluid stream contains a carbon dioxide fraction. The carbon capture system is configured to remove a portion of the carbon dioxide fraction from the pressurized feed fluid stream, resulting in a depleted fluid stream. A turbine is configured to recuperate power from the depleted fluid stream by converting pressure to work through the turbine.

In a second aspect, the disclosure provides a method for recuperating power from a pressurized feed fluid stream of a carbon capture system. A feed fluid stream is provided containing a carbon dioxide fraction. The feed fluid stream is compressed in a compression system, producing a pressurized feed fluid stream. A portion of the carbon dioxide fraction is removed from the pressurized feed fluid stream in the carbon capture system, resulting in a depleted fluid stream. Power is extracted from the depleted fluid stream by converting pressure to work through a turbine.

Further aspects and embodiments are provided in the foregoing drawings, detailed description and claims.

BRIEF DESCRIPTION OF DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
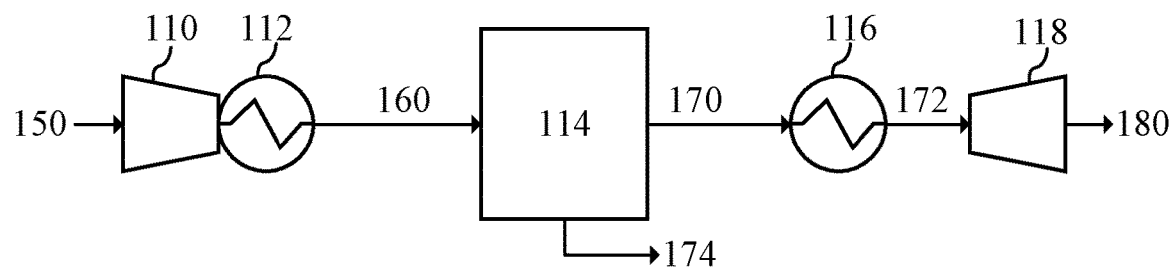
FIG. 1 is a process flow diagram showing a system for recuperating power from a pressurized feed fluid stream of a carbon capture system.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "turbine" refers to turbines, expanders, hydroexpanders, and other equipment that reduces pressure of a fluid while extracting work from the pressure loss.

As used herein, "carbon capture" refers to the removal of carbon dioxide and other acid gases from a fluid stream, especially a gas stream like flue gas, refinery off-gas, and other gases defined below. Acid gases include carbon dioxide, sulfur oxides, nitrogen oxides, mercury, mercury oxides, and carbon monoxide.

As used herein, "waste heat" is any heat that is normally lost as part of a process. Recovering heat from a waste heat stream means that a cool stream is passed against the waste heat stream across a heat exchanger, such as an indirect contact heat exchanger.

As used herein, "dried" refers to a gas or liquid stream that has had water removed, such as when flue gas is dried to remove water vapor, resulting in a dried flue gas stream.

As used herein, "depleted" refers to a gas or liquid stream that has had a component removed, such as carbon dioxide. A flue gas stream that has had carbon dioxide removed is a depleted flue gas stream.

As used herein, "wet" refers to a gas or liquid stream that has had water added, such as when a contact liquid captures water and becomes a wet contact liquid.

As used herein, "enriched" refers to a gas or liquid stream that has had a component added, such as when a contact liquid captures carbon dioxide and becomes an enriched contact liquid.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

In the carbon capture systems of which the inventors are aware, there has been no system that pressurizes the feed fluid stream, removes the carbon dioxide, and then recovers power from the pressurized system. Systems of the present disclosure pressurize the flue gas or other carbon dioxide containing feed gas, passes this gas stream through a carbon capture process, and then expands the depleted gas stream through a turbine, recovering power from the higher pressure fluid. This allows for the carbon capture system to operate at higher pressures. Higher pressures are more efficient for several carbon capture processes, but pressurization is a significant expense. However, by recuperating this power, the efficiency for the carbon capture system is increased. This power can be in the source of electricity, compression of natural gas, compressed inert gases, mechanical work, or other types of power recuperation.

The flow rate through the turbine is less than the flow rate through the compressor because of carbon dioxide removal.

Now referring to FIG. 1, FIG. 1 is a process flow diagram showing a system for recuperating power from a pressurized feed fluid stream of a carbon capture system that may be used in one embodiment of the present disclosure. A feed fluid stream 150 contains a carbon dioxide fraction. A multi-stage (or single stage?) compressor 110 (with heat exchangers 112 is configured to compress the feed fluid stream 150 isothermally to produce a pressurized feed fluid stream 160. A carbon capture system 114 is configured to remove a portion of the carbon dioxide from the pressurized feed fluid stream 160, resulting in a depleted fluid stream 170 and a carbon dioxide stream 174. A second heat exchanger 116 is configured to heat the depleted fluid stream 170 against a waste heat stream, resulting in a warm depleted gas stream 172. A turbine 118 is configured to extract power from the warm depleted gas stream 172 by converting pressure to work through the turbine 118, resulting in a low-pressure depleted gas stream 180. The work produced by expansion across the turbine 118 is the recuperated power for the system.

Non-limiting examples of suitable carbon capture systems are presented in commonly assigned U.S. Pat. No. 11,325,087 to Baxter, U.S. Pat. No. 11,318,417 to Baxter, U.S. Pat. No. 11,035,611 to Baxter et al., U.S. Pat. No. 10,995,984 to Baxter et al., U.S. Pat. No. 10,969,169 to Baxter et al., U.S. Pat. No. 10,213,731 to Baxter et al., U.S. Pat. No. 9,410,736 to Baxter and U.S. Pat. No. 9,250,012 to Baxter, the contents of each of which are hereby incorporated by reference.

Figure 2:
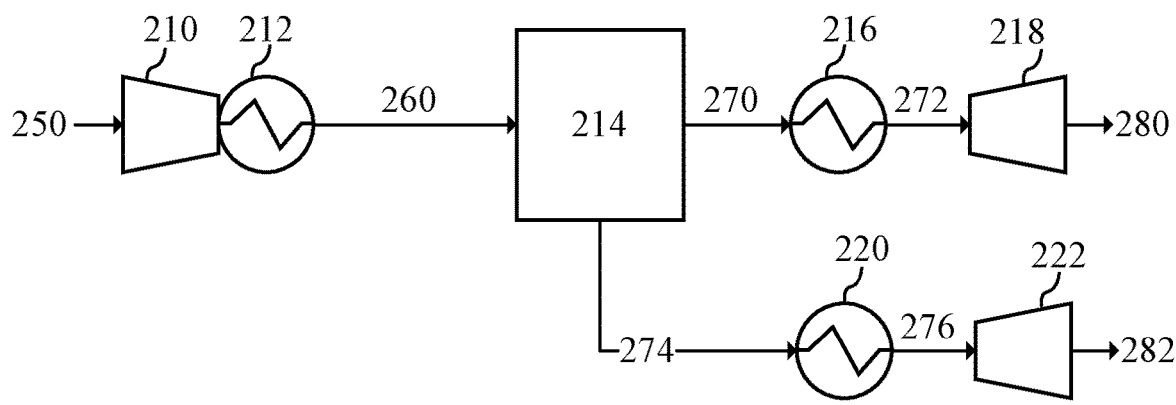
FIG. 2 is a process flow diagram showing a system for recuperating power from a pressurized feed fluid stream of a carbon capture system.

FIG. 2 is a process flow diagram showing a system for recuperating power from a pressurized feed fluid stream of a carbon capture system that may be used in an alternative embodiment of the present disclosure. In the embodiment of this figure, a flue gas stream containing carbon dioxide and the other acid gases is the feed fluid stream 250. A multi-stage compressor 210 with heat exchangers 212 is configured to compress the feed fluid stream 250 isothermally to produce a pressurized feed fluid stream 260. A cryogenic carbon capture system 214 is configured to remove a portion of the carbon dioxide and the acid gases from the pressurized feed fluid stream 260, resulting in a depleted fluid stream 270 and a carbon dioxide stream 274. A second heat exchanger 216 is configured to heat the depleted fluid stream 270 against a waste heat stream, resulting in a warm depleted gas stream 272. A first turbine 218 is configured to extract power from the warm depleted gas stream 272 by converting pressure to work through the first turbine 218, resulting in a low-pressure depleted gas stream 280. The carbon dioxide stream 274 is heated in a third heat exchanger 220, resulting in a warm carbon dioxide stream 276. A second turbine 222 is configured to extract power from the warm carbon dioxide stream 276 by converting pressure to work through the second turbine 222, resulting in a low-pressure carbon dioxide stream 282. The work produced by expansion across the first and second turbines 218 and 222 is the recuperated power for the system.

Figure 3:
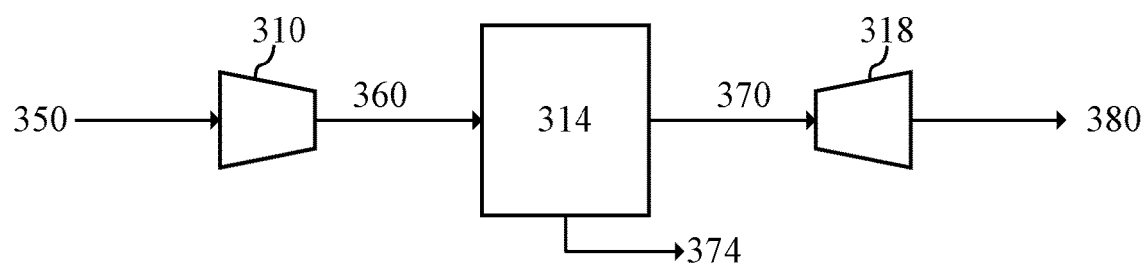
FIG. 3 is a process flow diagram showing a system for recuperating power from a pressurized feed fluid stream of a carbon capture system.

FIG. 3 is a process flow diagram showing a system for recuperating power from a pressurized feed fluid stream of a carbon capture system that may be used in one embodiment of the present disclosure. A feed fluid stream 350 contains a carbon dioxide fraction. A compressor 310 is configured to compress the feed fluid stream 350 to produce a pressurized feed fluid stream 360. A carbon capture system 314 is configured to remove a portion of the carbon dioxide from the pressurized feed fluid stream 360, resulting in a depleted fluid stream 370 and a carbon dioxide stream 374. A turbine 318 is configured to extract power from the depleted gas stream 372 by converting pressure to work through the turbine 318, resulting in a low-pressure depleted gas stream 380. The work produced by expansion across the turbine 318 is the recuperated power for the system.

Figure 4:
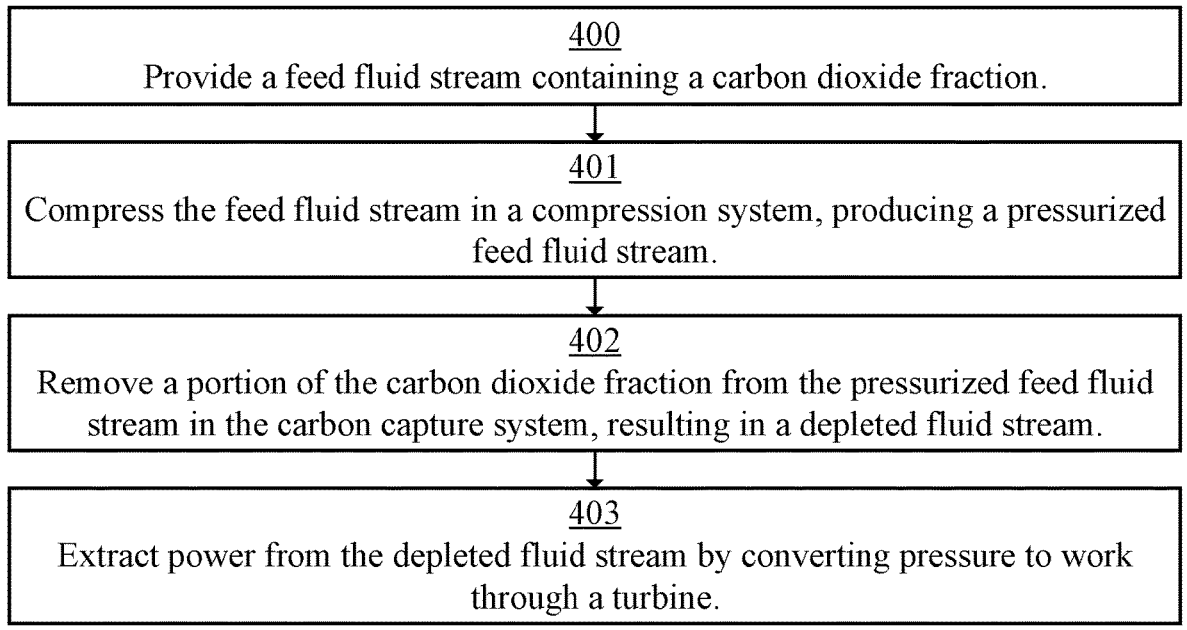
FIG. 4 is a flow diagram showing a method for recuperating power from a pressurized feed fluid stream of a carbon capture system.

FIG. 4 is a flow diagram showing a method for recuperating power from a pressurized feed fluid stream of a carbon capture system that may be used in one embodiment of the present disclosure. At 400, a feed fluid stream is provided containing a carbon dioxide fraction. At 401, the feed fluid stream is compressed in a compression system, producing a pressurized feed fluid stream. At 402, a portion of the carbon dioxide fraction is removed from the pressurized feed fluid stream in the carbon capture system, resulting in a depleted fluid stream. At 403, power is extracted from the depleted fluid stream by converting pressure to work through a turbine.

Figure 5:
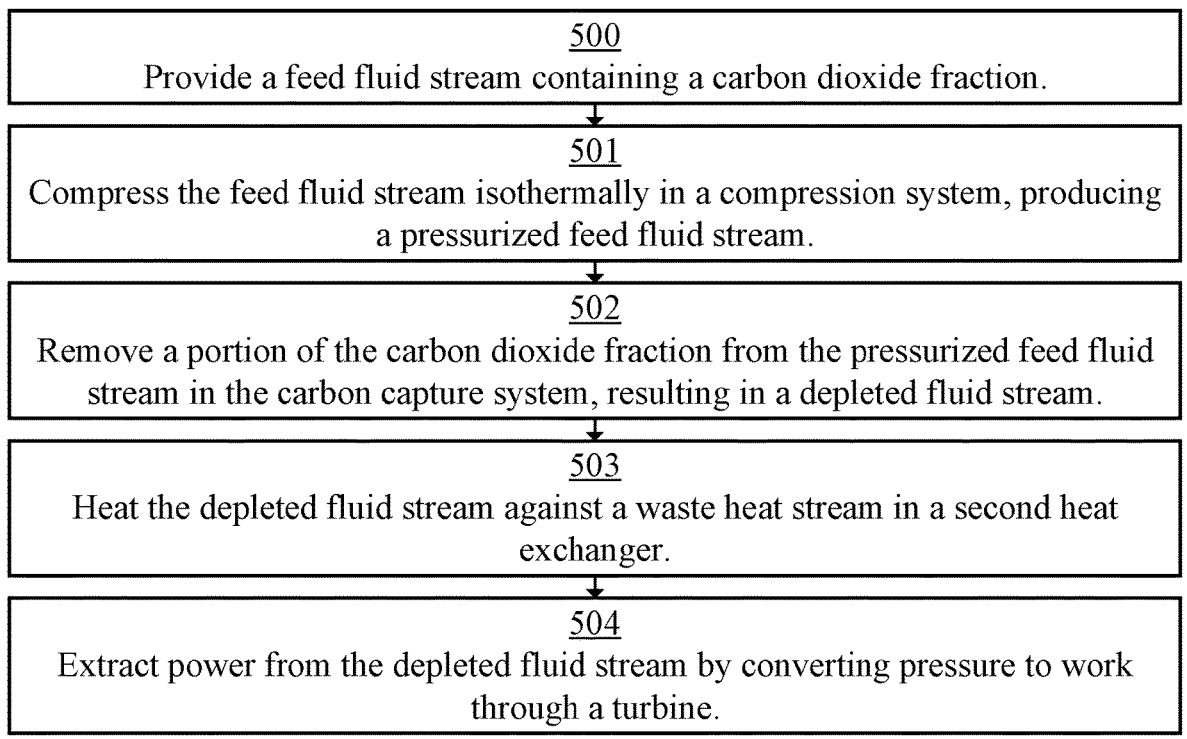
FIG. 5 is a flow diagram showing a method for recuperating power from a pressurized feed fluid stream of a carbon capture system.

FIG. 5 is a flow diagram showing a method for recuperating power from a pressurized feed fluid stream of a carbon capture system that may be used in one embodiment of the present disclosure. At 500, a feed fluid stream is provided containing a carbon dioxide fraction. At 501, the feed fluid stream is compressed isothermally in a compression system, producing a pressurized feed fluid stream. At 502, a portion of the carbon dioxide fraction is removed from the pressurized feed fluid stream in the carbon capture system, resulting in a depleted fluid stream. At 503, the depleted fluid stream is heated against a waste heat stream in a second heat exchanger. At 504, power is extracted from the depleted fluid stream by converting pressure to work through a turbine.

Figure 6:
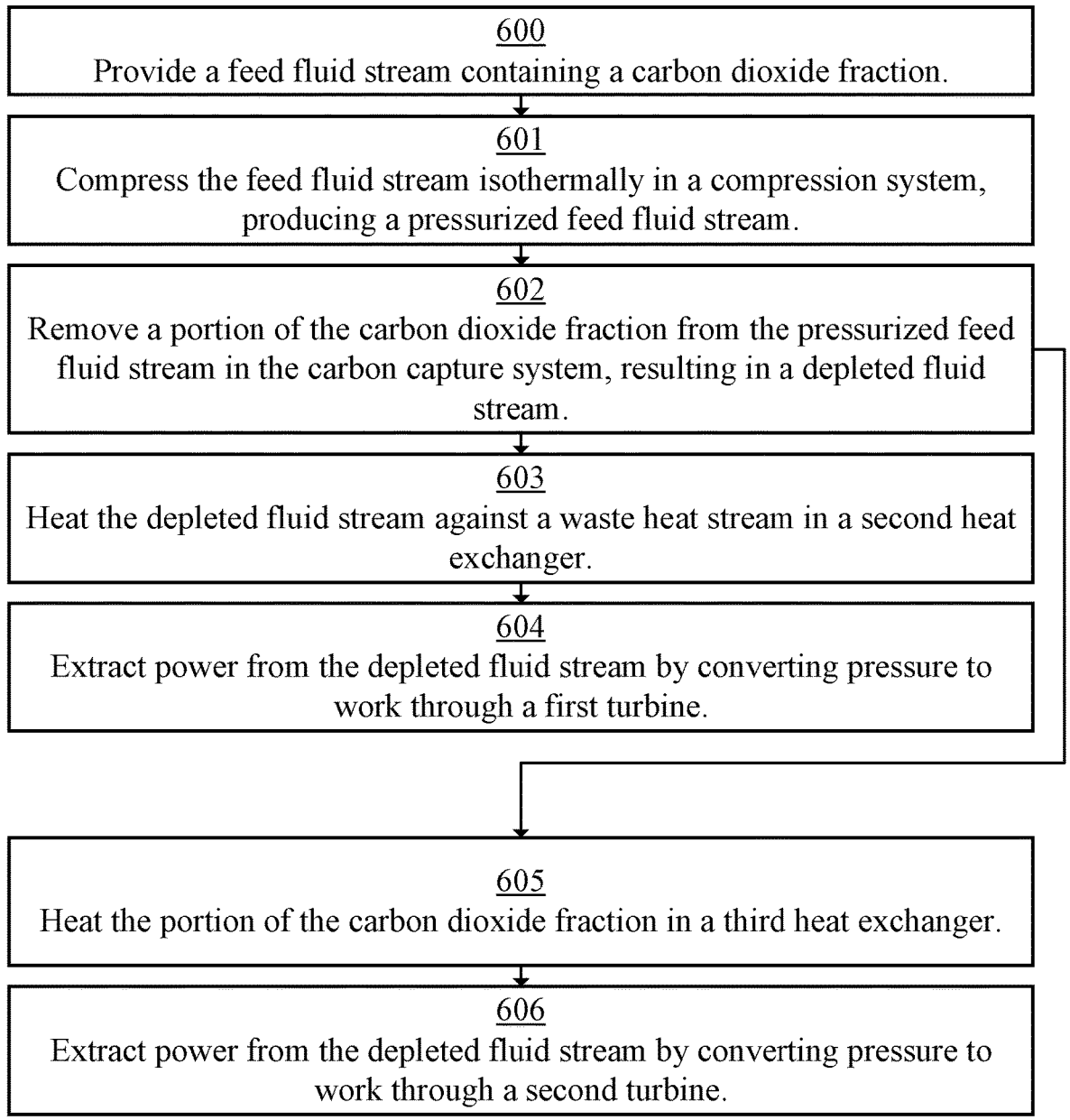
FIG. 6 is a flow diagram showing a method for recuperating power from a pressurized feed fluid stream of a carbon capture system.

FIG. 6 is a flow diagram showing a method for recuperating power from a pressurized feed fluid stream of a carbon capture system that may be used in one embodiment of the present disclosure. At 600, a feed fluid stream is provided containing a carbon dioxide fraction. At 601, the feed fluid stream is compressed isothermally in a compression system, producing a pressurized feed fluid stream. At 602, a portion of the carbon dioxide fraction is removed from the pressurized feed fluid stream in the carbon capture system, resulting in a depleted fluid stream. At 603, the depleted fluid stream is heated against a waste heat stream in a second heat exchanger. At 604, power is extracted from the depleted fluid stream by converting pressure to work through a first turbine. At 605, the carbon dioxide fraction is heated in a third heat exchanger. At 606, power is extracted from the depleted fluid stream by converting pressure to work through a second turbine.

The invention has been described with reference to various specific and preferred embodiments and techniques. Nevertheless, it is understood that many variations and modifications may be made while remaining within the spirit and scope of the invention.

What is claimed is:

1. A system for recuperating power from a pressurized feed fluid stream of a carbon capture system comprising:
a compression system configured to receive and compress a feed fluid stream including a carbon dioxide fraction, resulting in the pressurized feed fluid stream, and to direct the pressurized feed fluid stream to the carbon capture system, wherein the compression system comprises a compressor and at least one first heat exchanger;
wherein the carbon capture system is configured to remove at least a portion of the carbon dioxide fraction resulting in a depleted fluid stream;
a second heat exchanger downstream of the carbon capture system, wherein the second heat exchanger is configured to heat the depleted fluid stream exiting the carbon capture system; and
a turbine located downstream of the second heat exchanger and configured to receive the depleted fluid stream from the carbon capture system and to extract power from the depleted fluid stream by converting pressure to work through the turbine.

2. The system of claim 1, wherein removing the portion of the carbon dioxide fraction results in a reduction of pressure in the pressurized feed fluid stream.

3. The system of claim 1, wherein the compression system comprises one or more compressors in series with the at least one first heat exchanger configured to compress the feed fluid stream isothermally.

4. The system of claim 1, wherein the second heat exchanger is configured to heat the depleted fluid stream against a waste heat stream.

5. The system of claim 1, wherein the portion of the carbon dioxide fraction is a fluid and a second turbine is configured to extract power from the portion of the carbon dioxide fraction by converting pressure to work through the second turbine.

6. The system of claim 1, wherein the feed fluid stream further comprises other acid gases consisting of sulfur oxides, nitrogen oxides, mercury, mercury oxides, and carbon monoxide, and the carbon capture system is further configured to remove a portion of the other acid gases.

7. A method for recuperating power from a pressurized feed fluid stream of a carbon capture system comprising:
receiving a feed fluid stream comprising a carbon dioxide fraction;
compressing the feed fluid stream in a compression system, producing a pressurized feed fluid stream, wherein the compression system includes a compressor and at least one first heat exchanger;
providing the pressurized feed fluid stream to the carbon capture system;
removing at least a portion of the carbon dioxide fraction from the pressurized feed fluid stream in a carbon capture system resulting in a depleted fluid stream;
heating the depleted fluid stream in a second heat exchanger downstream of the carbon capture system; and
extracting power from the depleted fluid stream by converting pressure to work through a turbine located downstream of the second heat exchanger.

8. The method of claim 7, wherein removing the portion of the carbon dioxide fraction results in a reduction of pressure in the pressurized feed fluid stream.

9. The method of claim 7, wherein compressing the feed fluid stream comprises a multi-stage isothermal compression using one or more compressors in series with the at least one first heat exchanger.

10. The method of claim 7, wherein the depleted fluid stream is heated against a waste heat stream.

11. The method of claim 7, wherein the portion of the carbon dioxide fraction is a fluid and further comprising extracting power from the portion of the carbon dioxide fraction by converting pressure to work through a second turbine.

12. The method of claim 7, wherein the feed fluid stream further comprises other acid gases consisting of sulfur oxides, nitrogen oxides, mercury, mercury oxides, and carbon monoxide, and a portion of the other acid gases are removed in the carbon capture system.

\* \* \* \* \*